Jan. 28, 1964     S. L. RIEBEN     3,119,363
ADJUSTABLE WAVE SOLDERING APPARATUS
Filed Sept. 6, 1961     2 Sheets-Sheet 1
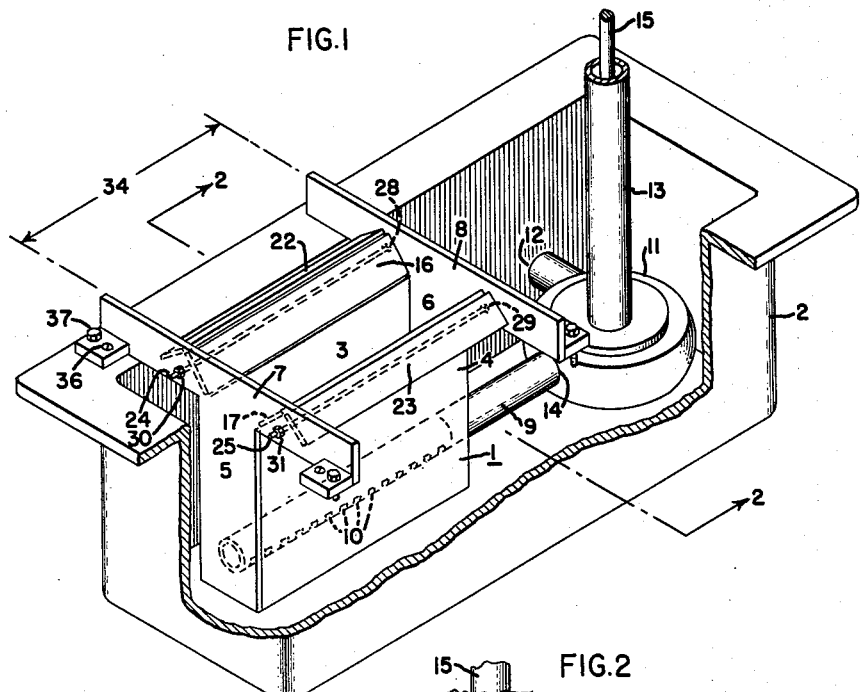
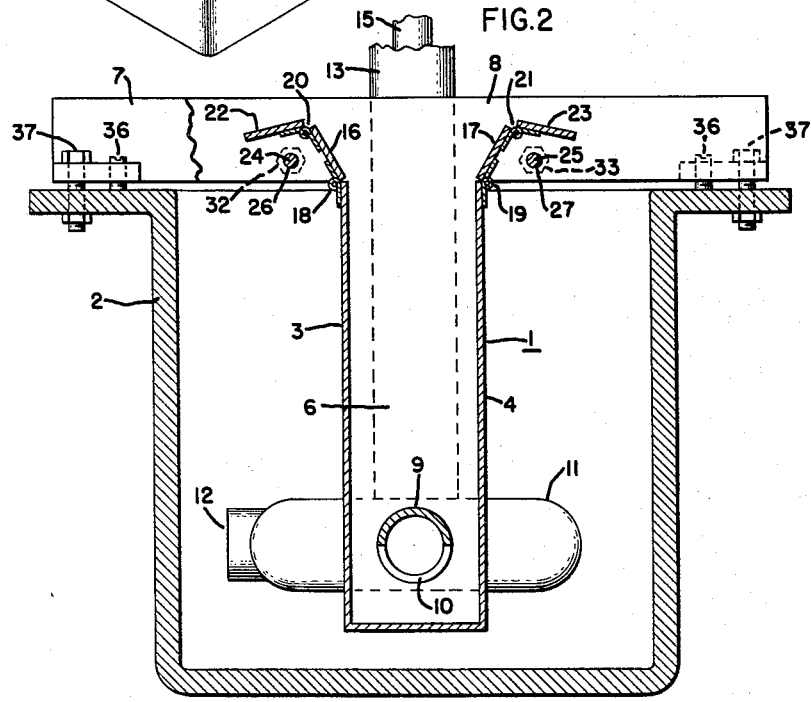
INVENTOR:
STUART RIEBEN,
BY *Joseph Levinson*
HIS ATTORNEY.

Jan. 28, 1964  S. L. RIEBEN  3,119,363
ADJUSTABLE WAVE SOLDERING APPARATUS
Filed Sept. 6, 1961  2 Sheets-Sheet 2
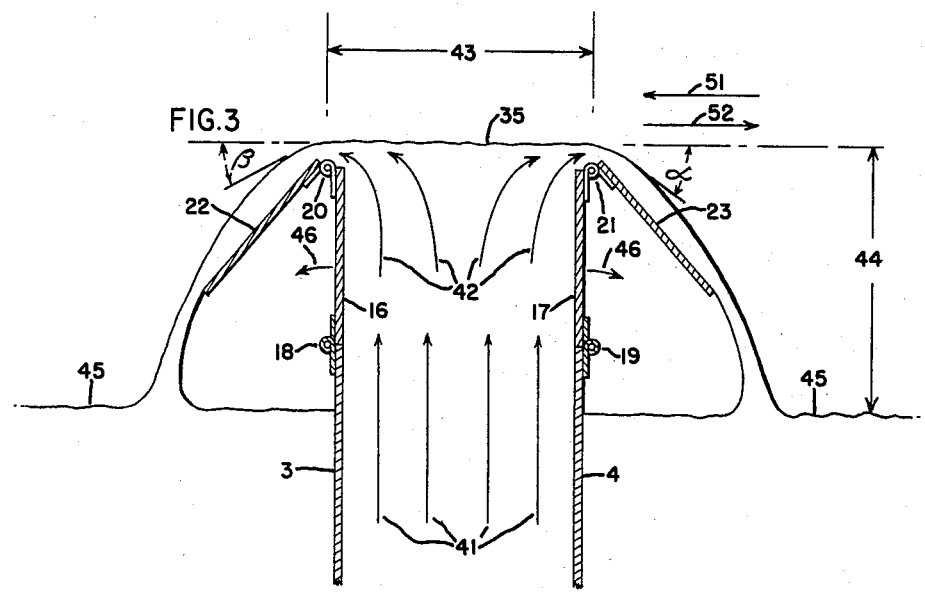
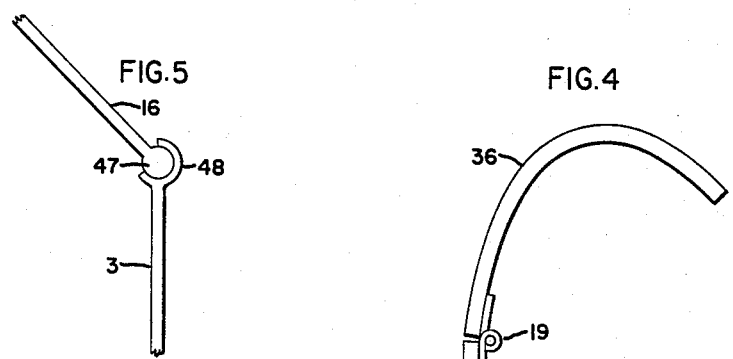
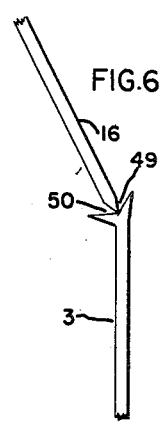
INVENTOR:
STUART RIEBEN,
BY Joseph Levinson
HIS ATTORNEY.

United States Patent Office 3,119,363
Patented Jan. 28, 1964

3,119,363
ADJUSTABLE WAVE SOLDERING APPARATUS
Stuart L. Rieben, Camillus, N.Y., assignor to General Electric Company, a corporation of New York
Filed Sept. 6, 1961, Ser. No. 136,262
5 Claims. (Cl. 113—126)

This invention relates to a wave soldering machine and more particularly to an improvement in a wave forming nozzle utilized in a wave soldering machine.

Wave soldering machines known in the art consist of a large solder pot containing molten solder, a duct positioned in the pot and generally immersed in the molten solder for conducting molten solder from a lower level in the pot to the surface, a pump for forcing the molten solder through the duct and a nozzle connected to an output aperture on the duct. The aperture is generally located near the surface of the molten solder and forms the solder which is forced through the duct, into a stationary bell-shaped solder waveform on the surface of the molten solder.

Wave soldering machines are utilized to provide improved automated soldering in production line assembly operations. In the usual arrangement employing a wave soldering machine, a conveyor system carries a unit to be soldered, as for example a printed circuit board, at a fixed level to the wave soldering machine. One surface of the board is soldered without changing the fixed level of the board by passing the board through the crest of the solder wave. Since the crest of the wave is above the surface of the molten solder, the conveyor system may be arranged so that it need not provide deviations from a fixed carrier level such as that required by the angled approach to and exit from solder put in a fixed solder bath type of soldering operation or a carrier pause and dipping motion required in the dip soldering method.

Different units to be soldered generally have varying soldering requirements. It is therefore desirable to vary certain characteristics of the solder wave in order to satisfy these requirements. For example, a typical soldering requirement which varies from one type of unit to another is the amount of time which a unit must spend in the soldering wave. This time is calculated by the rate of travel of the carrier and the distance which the unit traverses in the solder wave. Although the wave is generally bell-shaped, it normally has a flat top rather than the sloping shoulders and peak usually associated with bell shapes. This flat top portion of the wave, hereinafter referred to as the wave length of the wave, is substantially the distance which the unit to be soldered traverses in the wave. With a fixed wave length, the carrier speed must be varied for different units in order to vary soldering time in the wave. In many assembly operations, it is undesirable to vary the speed of the carrier.

Other wave form characteristics of a solder wave which affect the soldering operation are the angles of entry and exit. The angle of entry, hereinafter referred to as α, is the angle formed by a line substantially tangent to the slope of the wave at that point on the wave at which the unit to be soldered enters the wave and a line parallel to the flat-top portion of the wave. The angle of exit, hereinafter referred to as β, is an angle corresponding to the angle of entrance at the point at which the soldered unit leaves the wave. The angles of entrance and exit determine the rate of heating and the amount of solder build up at the joints respectively on the unit being soldered. It is desirable that these angles be adjustable in order to accommodate the different soldering requirements of different units.

Heretofore, the nozzle utilized in wave soldering apparatus has provided a fixed wave length and fixed angles of entry and exit. Means for varying the wave length and these angles has been provided to some degree by varying the height of the solder wave above the surface of the molten solder. This has been accomplished by increasing or decreasing the pumping speed. This means for varying the height of the solder wave requires a compromise in selection of the three aforementioned characteristics since each of these characteristics are simultaneously varied with the pumping speed.

Accordingly, it is an object of this invention to provide a wave soldering machine having means for individually varying the wave length, angle of entry, and angle of exit of the solder wave.

Another object of this invention is to provide a wave soldering machine with an improved nozzle having means for individually varying the wave length, angle of entry and angle of exit of the solder wave.

A further object of this invention is to provide a wave soldering machine having an inexpensive and easily adjustable means for individually varying the wave length, angle of entrance, and angle of exit of a solder wave.

In accordance with this invention, an adjustable nozzle is provided in a wave soldering machine for varying the wave length, angle of entry and angle of exit individually. The nozzle includes adjustable surfaces for varying each of these characteristics.

Further objects, features and attending advantages of this invention will be apparent with reference to the following specification and drawings in which:

FIGURE 1 is an isometric view partly cut away of a wave soldering apparatus embodying the present invention, FIGURE 2 is an enlarged cross-sectional view taken along lines 2—2 of FIGURE 1 showing the duct and nozzle portions of the wave soldering apparatus embodying the present invention, FIGURE 3 is a cross-sectional view of the duct and wave forming surfaces showing a solder wave being formed thereby, FIGURE 4 shows one embodiment of the nozzle of the present invention, FIGURE 5 shows another embodiment of the nozzle of the present invention and FIGURE 6 shows a further embodiment of the nozzle of the present invention.

Referring now to FIGURES 1 and 2, a duct 1, preferably of stainless steel, having a rectangular cross section and a sealed lower end is shown positioned in a large solder pot 2. Leveling screws 36 support the duct 1 in the pot 2 and locking screws 37 maintain the position of the duct after it has been leveled. The duct 1 has parallel surfaces 3 and 4 and parallel surfaces 5 and 6. Surfaces 3, 4, 5 and 6 form an output aperture for the duct of rectangular cross section at the upper termination of surfaces 3 and 4. The duct is positioned in a manner so that its output aperture is near the surface of a molten solder which fills the solder pot. The surfaces 5 and 6 extend longitudinally and laterally beyond the output aperture so that surfaces 5 and 6 each resemble the letter T having cross bars 7 and 8 respectively. A pipe 9, positioned in the lower part of the solder pot, extends into the duct 1 through an orifice in the lower portion of surface 6. That part of the pipe within the duct 1 includes slots 10 along the length of its lower surface. The slots 10 provide laminar flow of the molten solder in the upper portions of the duct 1 and nozzle which is hereinafter described.

A pump 11 having an inlet orifice 12 is suspended in the pot 2 by a drive shaft housing 13. The inlet orifice 12 is suspended in molten solder. The pipe 9 is connected to an output orifice 14 on the pump 11. A drive shaft 15 within the housing 13 couples a motive force to the pump 11. The drive shaft 15 is rotated by any conventional source of power, not shown, such as a motor coupled to the shaft by pulleys and drive belts, not shown.

In accordance with this invention, an inexpensive and easily adjustable nozzle is connected to the output aperture of the duct for creating desired solder wave forms. Referring again to FIGURE 1 and to the enlarged view of the nozzle and duct in FIGURE 2, rectangular wave forming nozzle surfaces 16 and 17 are shown connected by a pair of hinges 18 and 19 to the surfaces 3 and 4, respectively. A pair of hinges 20 and 21 connect a pair of nozzle wave forming surfaces 22 and 23 to the surfaces 16 and 17, respectively. The hinges 18, 19, 20 and 21 extend along the full width of their corresponding surfaces and are of a type which will substantially prevent the flow of solder between the hinge elements into the solder pot. The hinges shown in FIGURES 1 and 2 and suitable for this application are piano type hinges.

Since nozzle surfaces 16, 17, 22 and 23 are pivotally mounted, their respective positions with relation to the duct 1 can easily be changed by simply exerting a force on the nozzle surfaces until the surface acted upon assumes the desired position. The surfaces are then locked in position by any means well known in the art. FIGURES 1 and 2 illustrate a simple means providing this locking force. A pair of rods, 24 and 25, are shown interconnecting the cross bar portions 7 and 8 of the surfaces 5 and 6, respectively in a manner so as to bind the hinged surfaces 16, 17, 22 and 23 in a selected position. Each rod is threaded near its ends. The rods are passed through holes 26 and 27 in the cross bar 7 and through corresponding holes 28 and 29 in the cross bar 8. A plurality of nuts 30, 31, 32 and 33 secure the rods in position. The force exerted by these nuts on the surface of the cross bars 7 and 8 forces the cross bars toward each other resulting in a binding force on the adjustable surfaces 16, 17, 22 and 23.

In operation, the pump 11 of the wave soldering machine forces molten solder from a lower level in the solder pot through the pipe 9 into the duct 1. Upon flowing from the pipe 9 via the slots 10, the molten solder rises in the duct 1 to the output aperture. The solder flows over the surfaces 16, 17, 22 and 23 and has a wave shape determined by the relative positions of these surfaces. The width of the wave produced is determined by the width 34 of the wave forming surface as illustrated in FIGURE 1. The cross bars 7 and 8 provide end boundaries for the wave and the positional relation between these cross bars and the wave forming surface is adjusted in a manner so that solder flows only over the control surfaces and not over the end boundaries.

Referring now to FIGURE 3, a solder wave 35 and wave forming surfaces are illustrated. The characteristics of the wave 35 which may be altered and the corresponding wave forming surface of the nozzle for altering these characteristics are shown. Arrows 41 indicate the solder flow as the solder passes the output aperture of the duct 1 while arrows 42 indicate the diversion in direction of solder flow as the solder reaches the nozzle orifice formed by the surfaces 16 and 17. At a fixed pumping speed, the wave length 43 and the height of the wave 44 above the level 45 of the molten solder in the pot will be determined by the adjustment of the surfaces 16 and 17. By rotating the surfaces 16 and 17 about their hinges an equal distance in the direction indicated by arrows 46, the wave length 43 will be increased and the height 44 decreased. FIGURE 3 illustrates the angle of entry α and exit β when the direction of travel of the unit to be soldered is as indicated by arrow 51. The illustrated angles, α and β, would be interchanged when the direction of travel of the unit to be soldered is as indicated by arrow 52. The angles of entry α and exit β may be varied by rotating surface 23 on its hinge 21 and by rotating the surface 22 on its hinge 20.

Alternate embodiments of the nozzle structure are illustrated in FIGURES 4, 5 and 6. FIGURE 4 illustrates a surface 36 pivotally mounted to surface 3 by a hinge 19. By preforming the surface 36 to a desired contour, the wave shape may be adjusted by fixing the position of one surface 36, rather than the equivalent two surfaces hereinbefore described. FIGURE 5 illustrates a ball 47 and socket 48 pivotal coupling means which can replace the hinge coupling of FIGURES 1, 2 and 3. FIGURE 6 illustrates an edge 49 and groove 50 pivotal coupling means which can replace the hinge coupling of FIGURES 1, 2 and 3.

While I have illustrated and described and have pointed out in the annexed claims certain novel features of my invention, it will be understood that variations, omissions, substitutions and changes in the forms and details of the system illustrated may be made by those skilled in the art without departing from the spirit of the invention and the scope of the claims.

What I claim as new and desire to secure by Letters Patent of the United States is:

1. A wave soldering apparatus comprising: a solder pot containing molten solder; a duct positioned in said solder pot; said duct having an output aperture; pumping means associated with said duct for forcing said molten solder through said duct from a level beneath the surface of said molten solder to the surface thereof; a wave forming nozzle connected to said duct at said output aperture; said nozzle including a first pair of surfaces for regulating the wave length and height of said wave, first adjustable means coupling each of said first pair of surfaces to said duct, a second pair of surfaces for regulating the angles of entry and exit of said wave, second adjustable means coupling one of said second pair of surfaces to one of said first pair of surfaces and the other of said second pair of surfaces to the other of said first pair of surfaces.

2. The apparatus of claim 1 wherein said first and second adjustable means comprises a hinge.

3. The apparatus of claim 1 wherein said first and second adjustable means comprises a ball and socket.

4. The apparatus of claim 1 wherein said first and second adjustable means comprises an edge and groove.

5. A wave soldering apparatus comprising: a solder pot containing molten solder; a duct positioned in said pot; said duct having an output aperture and first and second opposite walls; said first and second walls having longitudinal and lateral extensions beyond said aperture; pumping means associated with said duct for forcing said molten solder through said duct from a level beneath the surface of said molten solder to the surface thereof; a wave forming nozzle connected to said duct at said output aperture; said nozzle including first and second surfaces for regulating the wave length and height of said wave, means adjustably coupling said first surface to a third wall of said duct, means adjustably coupling said second surface to a fourth wall of said duct, third and fourth surfaces for regulating the angles of entry and exit of said wave, means adjustably coupling said third surface to said first surface, means adjustably coupling said fourth surface to said second surface; and means forcing said extensions of said first and second walls toward each other for securing said surfaces in a fixed position.

References Cited in the file of this patent

UNITED STATES PATENTS 2,993,272   Carlzen et al. _____ July 25, 1961

FOREIGN PATENTS 798,454   Great Britain _____ July 23, 1958